(12) United States Patent
Gerlach et al.

(10) Patent No.: US 8,005,467 B2
(45) Date of Patent: Aug. 23, 2011

(54) METHOD AND SYSTEM FOR PROVIDING A TELEMATICS READINESS MODE

(75) Inventors: Jonathan L. Gerlach, Canton, MI (US);
Ernest B. Rennells, Canton, MI (US);
Russell A. Patenaude, Macomb Township, MI (US)

(73) Assignee: General Motors LLC, Detroit, MI (US)

( * ) Notice: Subject to any disclaimer, the term of this patent is extended or adjusted under 35 U.S.C. 154(b) by 379 days.

(21) Appl. No.: 11/250,211

(22) Filed: Oct. 14, 2005

(65) Prior Publication Data

US 2007/0087733 A1    Apr. 19, 2007

(51) Int. Cl.
*H04M 3/00* (2006.01)

(52) U.S. Cl. ............... 455/418; 455/426.1; 455/419; 455/404.1; 455/456.1; 455/456.3; 340/539.18; 340/532; 340/426.12

(58) Field of Classification Search ............... 455/418, 455/419, 426.1, 404.1, 445, 456.1, 456.3; 340/426.12, 539.18, 532

See application file for complete search history.

(56) References Cited

U.S. PATENT DOCUMENTS

| | | | | |
|---|---|---|---|---|
| 4,606,073 A | * | 8/1986 | Moore | 455/90.1 |
| 5,550,551 A | * | 8/1996 | Alesio | 342/457 |
| 5,784,029 A | * | 7/1998 | Geier | 701/214 |
| 5,825,283 A | * | 10/1998 | Camhi | 340/438 |
| 5,969,598 A | * | 10/1999 | Kimura | 340/436 |
| 5,987,381 A | * | 11/1999 | Oshizawa | 701/209 |
| 6,151,551 A | * | 11/2000 | Geier et al. | 701/207 |
| 6,266,617 B1 | * | 7/2001 | Evans | 701/301 |
| 6,282,491 B1 | * | 8/2001 | Bochmann et al. | 701/209 |
| 6,324,393 B1 | * | 11/2001 | Doshay | 455/404.2 |
| 6,340,928 B1 | * | 1/2002 | McCurdy | 340/436 |
| 6,459,988 B1 | * | 10/2002 | Fan et al. | 701/213 |
| 6,690,302 B1 | * | 2/2004 | Inomata | 340/989 |
| 6,748,211 B1 | * | 6/2004 | Isaac et al. | 455/414.1 |
| 6,812,832 B2 | * | 11/2004 | Lobaza et al. | 340/436 |
| 6,812,860 B1 | * | 11/2004 | Schwarzwalder, Jr. | 340/995.18 |
| 6,851,504 B2 | * | 2/2005 | Campbell et al. | 180/271 |
| 7,119,669 B2 | * | 10/2006 | Lundsgaard et al. | 340/436 |
| 2003/0050038 A1 | * | 3/2003 | Haave et al. | 455/404 |
| 2003/0151507 A1 | * | 8/2003 | Andre et al. | 340/539.13 |
| 2004/0048598 A1 | * | 3/2004 | Gagnon | 455/404.2 |
| 2004/0162063 A1 | * | 8/2004 | Quinones et al. | 455/419 |
| 2004/0193343 A1 | * | 9/2004 | Tan et al. | 701/36 |
| 2005/0010340 A1 | * | 1/2005 | Peravali et al. | 701/29 |
| 2005/0065711 A1 | * | 3/2005 | Dahlgren et al. | 701/117 |
| 2005/0253705 A1 | * | 11/2005 | Yamazaki et al. | 340/539.13 |
| 2006/0007039 A1 | * | 1/2006 | Duvall | 342/357.08 |
| 2006/0033615 A1 | * | 2/2006 | Nou | 340/539.13 |

* cited by examiner

*Primary Examiner* — Kwasi Karikari

(74) *Attorney, Agent, or Firm* — Anthony L. Simon; Reising Ethington P.C.

(57) ABSTRACT

A method and system for providing a telematics readiness mode including receiving a first readiness mode input at a telematics unit, initiating a readiness mode responsive to the received first readiness mode input, receiving a second readiness mode input at the telematics unit while in the readiness mode, and determining a readiness action based on the received second readiness mode input. A computer usable medium with suitable computer program code is employed for providing a telematics readiness mode.

15 Claims, 5 Drawing Sheets

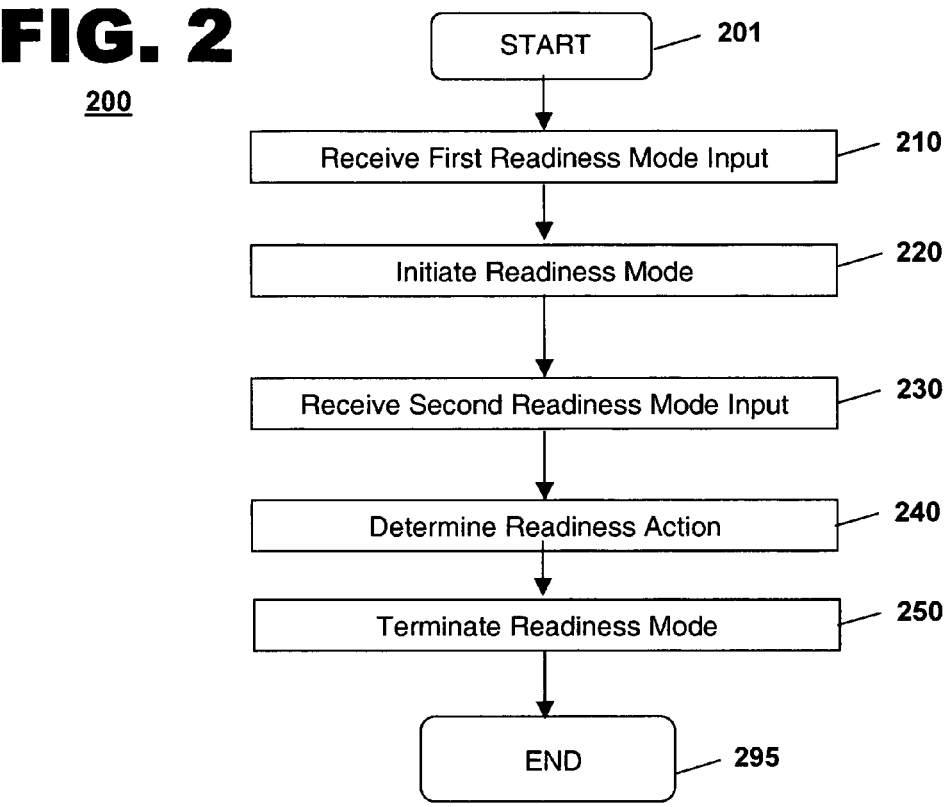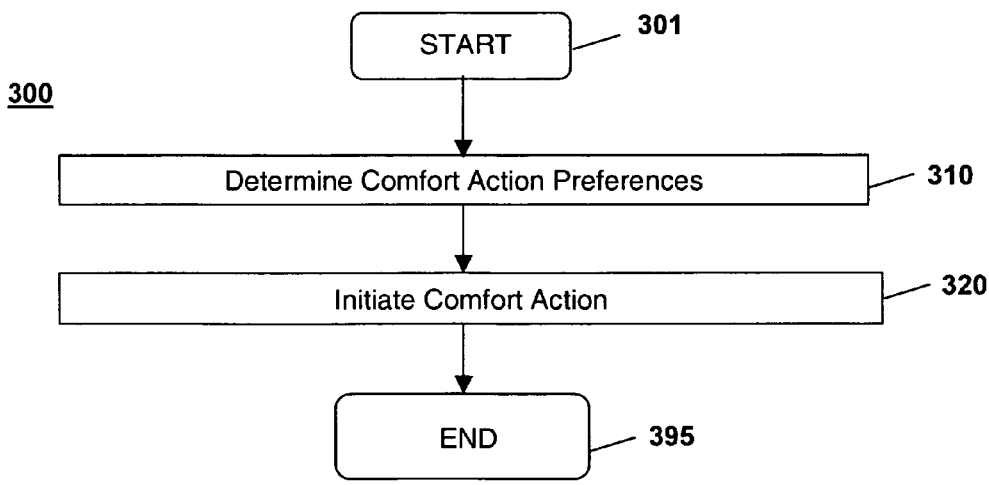

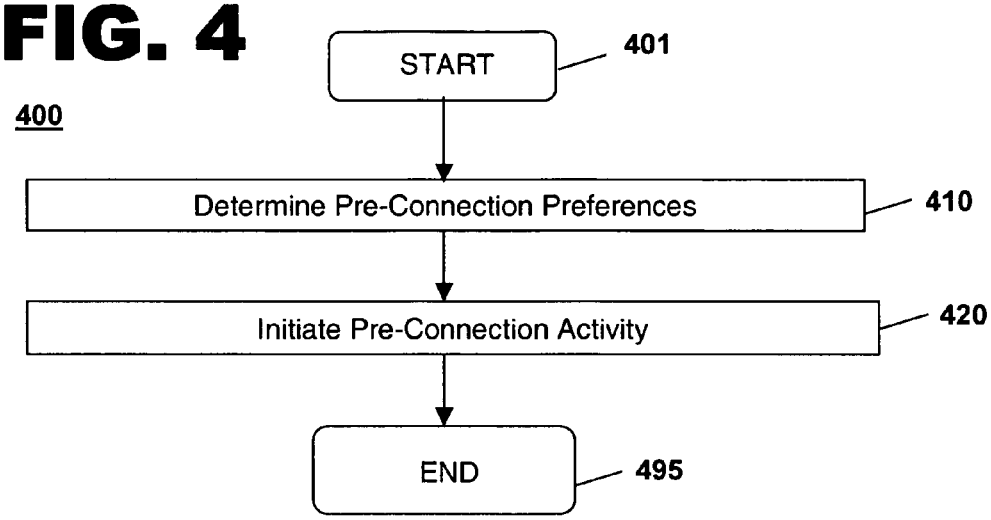
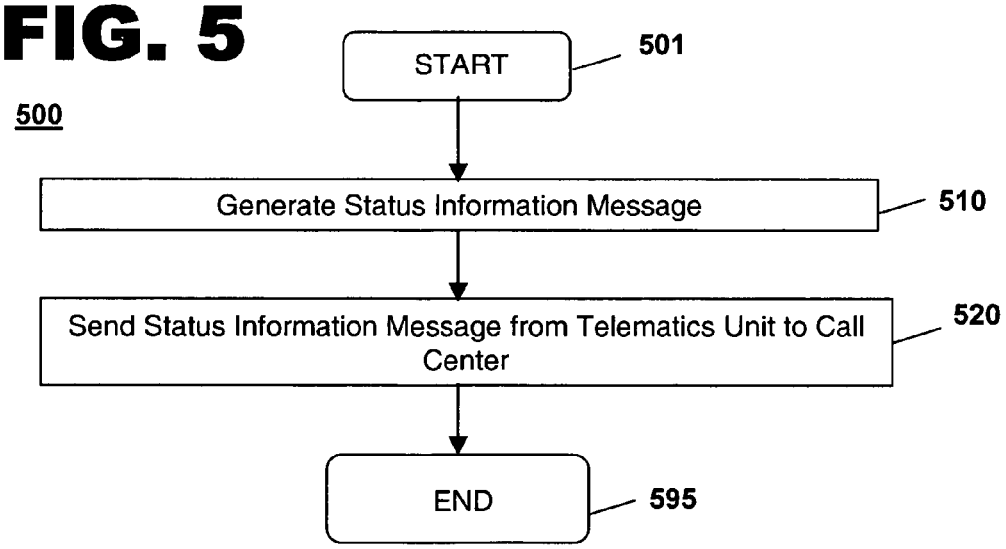

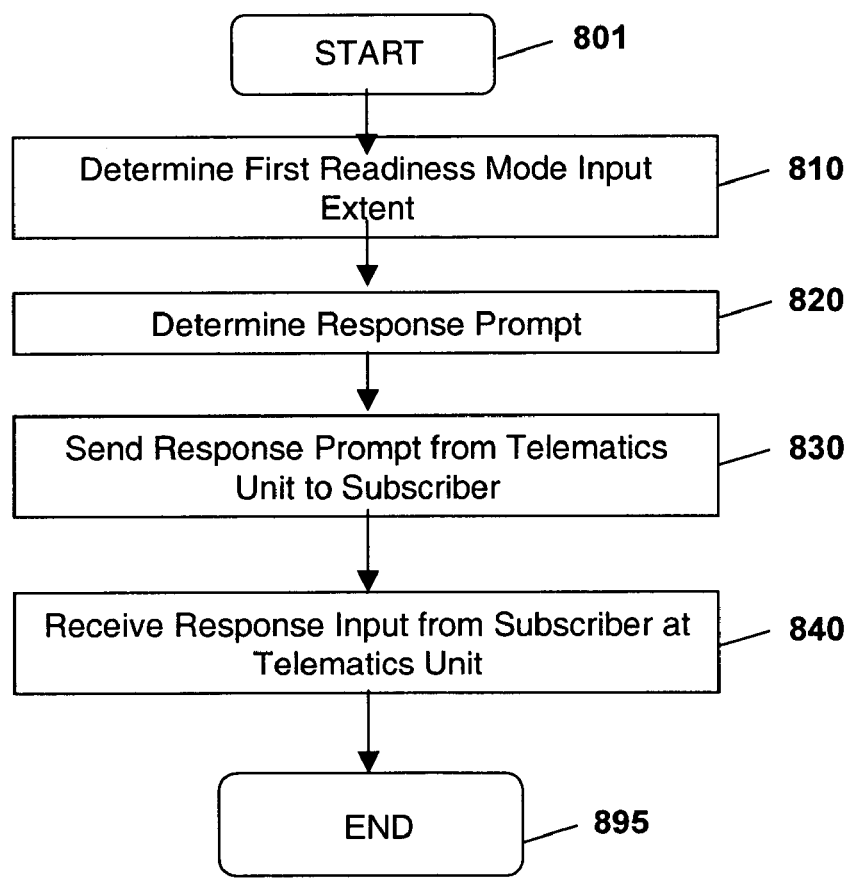

US 8,005,467 B2

METHOD AND SYSTEM FOR PROVIDING A TELEMATICS READINESS MODE

FIELD OF THE INVENTION

This invention relates generally to telematics systems. In particular the invention relates to a method and system for providing a telematics readiness mode.

BACKGROUND OF THE INVENTION

Telematics units enable a service provider access to information regarding a subscriber's vehicle. The service provider or the subscriber either through telematics unit input or a telephone call placed to a call center initiates information transfer. Currently the subscriber does not have a method for interacting with the call center without placing a service call and communicating with the service provider.

Situations exist where a subscriber anticipates the necessity of contacting a call center and wants the telematics unit to be ready if that need arises. Subscribers may experience a flat tire, vehicle breakdown, or other trouble that leaves them stranded in a strange place while they wait for help or try to fix the problem themselves. This could be on a deserted road, during the night, or in an unknown location. Additionally, while refueling, a subscriber must exit their vehicle and stand outside the vehicle for extended periods of time. If assistance is then required, actions are required in order to initiate contact. In an emergency, these methods may not be possible or feasible.

Currently there is not a way for a subscriber to alert a call center of a vehicle theft except by placing a phone call, which may not be possible if the subscriber is still within the vehicle or does not have access to a phone. In one scenario, a car thief will crash into the back of a vehicle to mimic a legitimate traffic accident. Most subscribers pull over at the scene, assess the damage, exchange insurance information and call the police. A potential car thief then has the opportunity to take the vehicle along with the subscriber or leave the subscriber stranded.

It is therefore desirable to provide a method and system for providing a telematics readiness mode that overcomes the limitations, challenges, and obstacles described above.

SUMMARY OF THE INVENTION

One aspect of the present invention provides a method for providing a telematics readiness mode including receiving a first readiness mode input at a telematics unit, initiating a readiness mode responsive to the received first readiness mode input, receiving a second readiness mode input at the telematics unit while in the readiness mode, and determining a readiness action based on the received second readiness mode input.

Another aspect of the present invention provides a system for providing a telematics readiness mode including means for receiving a first readiness mode input at a telematics unit, means for initiating a readiness mode responsive to the received first readiness mode input, means for receiving a second readiness mode input at the telematics unit while in the readiness mode, and means for determining a readiness action based on the received second readiness mode input.

A third aspect of the present invention provides a computer readable medium storing a computer program including computer program code for providing a telematics readiness mode including computer program code for receiving a first readiness mode input at a telematics unit, computer program code for initiating a readiness mode responsive to the received first readiness mode input, computer program code for receiving a second readiness mode input at the telematics unit while in the readiness mode, and computer program code for determining a readiness action based on the received second readiness mode input.

The aforementioned and other features and advantages of the invention will become further apparent from the following detailed description of the presently preferred example, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 illustrates a flowchart representative of an example of a method for providing a telematics readiness mode, in accordance with the present invention;

FIG. 3 illustrates a flowchart representative of an example of the step of determining a readiness action, in accordance with the present invention;

FIG. 4 illustrates a flowchart representative of an example of a method for initiating a pre-connection activity, in accordance with the present invention;

FIG. 5 illustrates a flowchart representative of an example of a method for providing status information to the call center, in accordance with the present invention;

FIG. 8 illustrates a flowchart representative of an example of a method for determining a response prompt, in accordance with the present invention.

DETAILED DESCRIPTION OF THE PRESENTLY PREFERRED EXEMPLARY EMBODIMENTS

Figure 1:
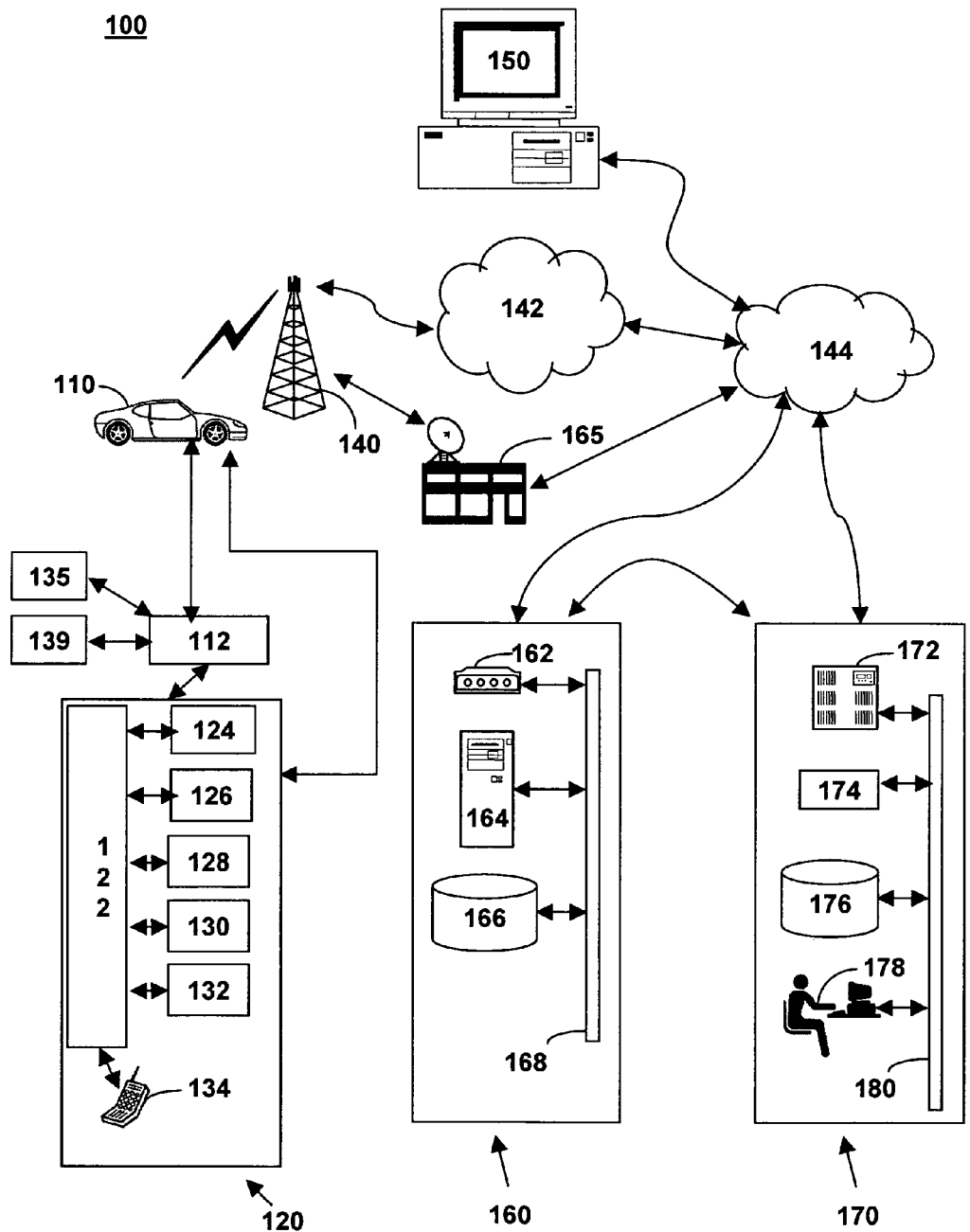
FIG. 1 illustrates one example of a system for providing a telematics readiness mode, in accordance with the present invention.

FIG. 1 illustrates an example system for providing a telematics readiness mode, in accordance with the present invention at 100. The telematics readiness mode system includes a mobile vehicle communication unit (MVCU) 110, a mobile vehicle communication network 112, one or more embedded modules 139, a communication device such as a telematics unit 120, one or more wireless carrier systems 140, one or more communication networks 142, one or more land networks 144, one or more client, personal, or user computers 150, one or more web-hosting portals 160, and one or more call centers 170. In one example, MVCU 110 is implemented as a mobile vehicle equipped with suitable hardware and software for transmitting and receiving voice and data communications. In one example, a display 135 such as a dialed digital display in a radio unit or in an instrument panel is embedded in MVCU 110. In other examples, MVCS 100 includes additional components not relevant to the present discussion. Mobile vehicle communication systems and telematics units are known in the art.

Embedded modules 139 are any electronic module configured to enable or assist in the operation of MVCU 110, or any of its included systems. For example, one embedded module performs odometer functions, while another embedded module controls HVAC operations within the mobile vehicle. Any number of embedded modules 139 can be included. Embedded modules 139 may contain, for example, one or more accelerometers utilized as collision detection sensors, where a rapid change in the data output of the accelerometers may imply a collision has occurred.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

Mobile vehicle communication network 112 sends signals to various units of equipment and systems within mobile vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, mobile vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one example, mobile vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

In one example, telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other examples, telematics unit 120 is implemented without one or more of the above listed components such as, for example, GPS unit 126 or speakers 132 or includes additional components not relevant to the present discussion.

In various examples, processor 122 is implemented as a digital signal processor (DSP), microcontroller, microprocessor, controller, host processor, or vehicle communications processor. In an example, processor 122 is implemented as an application-specific integrated circuit (ASIC). In another example, processor 122 is implemented as a processor working in conjunction with a central processing unit (CPU) performing the function of a general purpose processor. GPS unit 126 provides longitude and latitude coordinates of the mobile vehicle responsive to a GPS broadcast signal received from one or more GPS satellite broadcast systems (not shown). In-vehicle mobile phone 134 is a cellular-type phone such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, satellite uplink facility 165, and call center 170. In one example, land network 144 is a public-switched telephone network (PSTN). In another example, land network 144 is implemented as an Internet protocol (IP) network. In other examples, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160, satellite uplink facility 165, and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one example, the data includes directives to change certain programming and operational modes of electronic and mechanical systems within MVCU 110. In operation, a client utilizes computer 150 to initiate setting or re-setting of user preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. In one example, modem 162 resides inside web server 164. Land network 144 transmits data communications between web-hosting portal 160 and call center 170.

Web server 164 receives user-preference data from user computer 150 via land network 144. In alternative examples, computer 150 includes a wireless modem to send data to web-hosting portal 160 through a wireless communication network 142 and a land network 144. Data is received by land network 144 and sent to one or more web servers 164. In one example, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. In one example, web server 164 includes computer applications and files for managing and storing personalization settings supplied by the client and subscriber status supplied by telematics unit 120. For each subscriber, the web server potentially stores hundreds of preferences for wireless vehicle communication, networking, maintenance and diagnostic services for a mobile vehicle.

In one example, one or more web servers 164 are networked via network system 168 to distribute data among its network components such as database 166. In an example, database 166 is a part of or a separate computer from web server 164. Web server 164 sends data transmissions with status information to call center 170 through land network 144.

Call center 170 is a location where many calls are received and serviced at the same time, or where many calls are sent at the same time. In one example, the call center is a test center facilitating communications to mobile vehicle 110 for testing of embedded modules 139. In another example, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other examples, call center 170 and web-hosting portal 160 are located in the same or in different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives requests for a variety of services from the client via computer 150, web-hosting portal 160, and land network 144 and awareness messages from telematics unit 120. Communication services manager 174 transmits requests for subscriber status and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 can provide requested information to communication services advisor 178.

In one example, communication services advisor 178 is implemented as a real advisor. In an example, a real advisor is a human being in verbal communication with a user or subscriber (e.g., a client) in MVCU 110 via telematics unit 120. In another example, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicates with telematics unit 120 in MVCU 110 through wireless carrier system 140, communication network 142, land network 144 and web hosting portals 160 using voice or data transmissions. In an alternative example, communication services manager 174 communicates with telematics unit 120 in MVCU 110 through wireless carrier system 140, communication network 142, land network 144, and web hosting portals 160 using voice or data transmissions. Switch 172 selects between voice transmissions and data transmissions.

Communications services advisor 178 accesses a readiness mode input, a configuration, and a status information message that is received at communications services manager 174 or web hosting portal 160, and stored in database 166 or communication services database 176 when providing readiness actions to a subscriber.

As seen in FIG. 2 at 200, the readiness mode is an operational state of telematics unit 120 in which the telematics unit listens for additional input prior to the determination of a readiness action. A service call, where a specific service is requested by a subscriber in MVCU 110, is not initiated with call center 170 prior to receipt of the additional input at the telematics unit. A data call to the call center 170 may be initiated, with data transmitted to and temporarily stored at the call center 170. The method begins at 201.

During step 210, a first readiness mode input is received at telematics unit 120. The first readiness mode input is a manual or automatic input that instructs the telematics unit to expect further input and to be ready to receive that input. In one example, the first readiness mode input is manual input such as a button push or a voice command. An example of a situation where manual input is used is where a mobile vehicle condition requires the subscriber to leave the mobile vehicle, such as during refueling or following a mobile vehicle breakdown.

In another example, the first readiness mode input is an automatic input, requiring no subscriber intervention, such as a collision detection, or a theft detection. Examples of when automatic input activates the readiness mode are following a mobile vehicle accident or when a mobile vehicle is stolen, with or without the subscriber still within the mobile vehicle. These situations will automatically input the telematics unit to enter readiness mode. In an example, collision sensor data, such as a rapid change in acceleration received from one or more accelerometers will cause the telematics unit to enter readiness mode. In another example, theft sensor data, such as detecting a change in position via the GPS receiver 126 while the vehicle 110 is off will cause the telematics unit to enter readiness mode. In circumstances where automatic input is generated a subscriber still has the option of providing manual input.

In an example, receipt of the first readiness mode input results in the telematics unit 120 listening for additional input. "Listening" as used herein means any actions taken to determine the presence of one of at least two expected inputs (such as initiate a service call or exit readiness mode)—listening means that the telematics unit processes sensed input, such as sound and attempts to determine the meaning or an instruction associated with the input.

During step 220, a readiness mode is initiated responsive to the first readiness mode input. While in the readiness mode, the telematics unit waits for additional input (i.e., listens) needed to determine what further action is required. As shown in FIG. 4 telematics unit 120 is configured to initiate a pre-connection activity based on pre-connection preferences stored in the telematics unit. The telematics unit 120 may, for example, establish a vehicle data call with the call center 170 as part of the pre-connection activity. The vehicle data call transfers data, such as, for example, the vehicle 110 VIN (Vehicle Identification Number), current date, time and location to the call center 170 for temporary storage. The telematics unit is also configured to determine what action to take if further input is not received or the input received is not the input expected by the telematics unit.

During step 230, a second readiness mode input is received at the telematics unit. Second readiness mode inputs include a button push a voice command, a timeout, pre-defined word recognition, or a switch input. The second readiness mode input selected will vary based on the current circumstances at the mobile vehicle. The second readiness mode input guides the telematics unit in determining what further activity or readiness action is required. The second readiness mode input is provided by the subscriber, such as a voice command, button push, or switch input, or occurs automatically, such as a timeout.

During step 240, a readiness action is determined based on the second readiness mode input received at the telematics unit. The readiness action, if any, is a service provided to the subscriber while the telematics unit is in the readiness mode and second readiness mode input is given. Readiness actions include notifying a responder, initiating vehicle tracking, disabling vehicle mobility, and sending a stored record. A responder can be a fire department, police, ambulance, family member, friend, or other such person or similar person or entity.

During step 250, the readiness mode is terminated based on the readiness mode determination from the previous step. When a subscriber re-enters the mobile vehicle or no longer requires readiness mode, a button is pressed or a voice command is issued terminating readiness mode. In another example, the readiness mode is terminated upon occurrence of a timeout. Timeout values can be pre-defined or specified by a subscriber based on the situation encountered. In one example, the telematics unit will require further input from the subscriber upon occurrence of a timeout such as a button press, voice command, or other action. In yet another example the readiness mode is terminated upon completion of the readiness action. During step 295, the method 200 terminates.

FIG. 3 provides a flowchart 300 representative of example steps for determining a readiness action at 240 of FIG. 2. The step detail starts at 301.

During step 310, readiness action preferences are determined. The readiness action preferences include timeout values, valid readiness mode input types and the desired readiness action to initiate when a particular readiness mode input is received. In one example, action preferences, also known as the configuration, is stored at the telematics unit. In another example, the configuration is maintained at a call center and is used by the call center to determine what actions the call center should take when a particular readiness mode input is detected at the call center. In another example, no configuration is available and the readiness action is determined based on default readiness action preferences.

During step 320, the readiness action is initiated based on the readiness action preferences and the second readiness mode input. If the readiness mode was enabled by manual input such as a button press or voice command, the subscriber provides additional input prior to termination of the readiness mode. In one example, where the subscriber encounters a situation requiring a readiness action, the subscriber will issue a command to initiate the desired readiness action. In another example, where the subscriber returns to the mobile vehicle and no longer requires the readiness mode, a button press or voice command is issued to terminate the readiness mode and no readiness action is initiated. In another example, the occurrence of a timeout is the second readiness mode input that initiates a readiness action, such as enabling mobile vehicle tracking. A timeout may occur if the subscriber is unable to return to the mobile vehicle.

In another example, where the readiness mode was enabled by automatic input, such as theft detection, the telematics unit will require a pre-defined word recognition as the second readiness mode input in one example. The predefined word recognition is identification by telematics unit 120 of a previously stored word spoken by the subscriber that acts a voice password. If the telematics unit does not receive the voice password or the voice password is incorrect, any or all of the following readiness actions can be initiated, the mobile vehicle can be disabled, vehicle tracking can be activated, and a responder can be notified. Responders include emergency personnel, and vehicle service providers.

In one example, the pre-defined word recognition is replaced by a switch input. A switch input is activation of a particular mobile vehicle electrical switch, or combination of switches, such as a turn signal, light switch, or radio button that has been pre-defined to act as a non-verbal password. The switch input provides the subscriber a means for providing readiness mode input in a covert manner where verbal input is not possible or feasible, such as during a mobile vehicle theft where the subscriber is still in the mobile vehicle.

In another example, the voice password or non-verbal password is used to indicate that the subscriber is still within the mobile vehicle 110 and that assistance is necessary. The call center 170 can respond by sending a responder. The call center can also disable the mobile vehicle and start tracking of the mobile vehicle to assist the responder. During step 395, method 300 terminates.

FIG. 4 illustrates a flowchart 400 representative of example steps for initiating a pre-connection activity, in accordance with the present invention. The step detail starts at 401.

During step 410, pre-connection preferences are determined. The pre-connection preferences are stored in telematics unit 120 and indicate what pre-connection activities to initiate under particular circumstances. Pre-connection activities occur while the telematics unit is in the readiness mode but before a connection is made with a call center for providing a readiness action.

Figure 6:
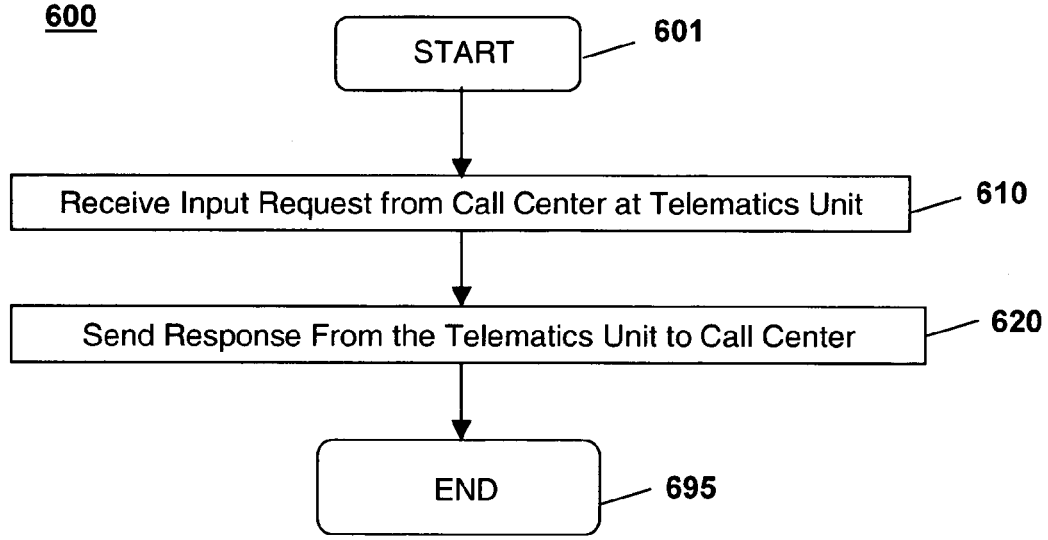
FIG. 6 illustrates a flowchart representative of an example of a method for providing subscriber input, in accordance with the present invention.
Figure 7:
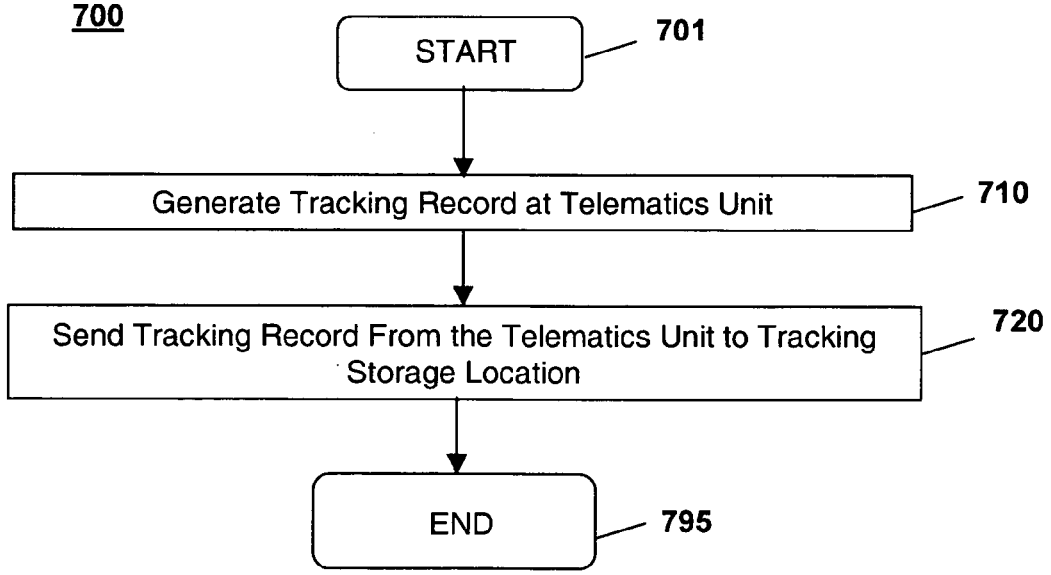
FIG. 7 illustrates a flowchart representative of an example of a method for providing a tracking record, in accordance with the present invention.

During step 420, the pre-connection activity is initiated based on the pre-connection preferences. Various pre-connection activities are available while the telematics unit is in the readiness mode. In one example, as shown in FIG. 5, a status information message is generated when the readiness mode is initiated. In another example, as shown in FIG. 6, the call center will send an input request, asking for input, which is received at the telematics unit. In another example, as shown in FIG. 7 the telematics unit generates a tracking record while in the readiness mode. In another example, as shown in FIG. 8 the telematics unit determines a response prompt to send to the subscriber. These activities can occur automatically, are specified in the pre-connection preferences, or are activated by the call center advisor. Any one of these pre-connection activities or a combination thereof can be employed while the telematics unit is in readiness mode. During step 495, method 400 terminates.

FIG. 5 illustrates a flowchart 500 representative of one example of a method for providing status information to the call center, in accordance with the present invention. Method 500 begins at 501. During step 510, the status information message indicative of the current state of the mobile vehicle is generated. The status information message includes data such as date, time, location, vehicle occupancy, vehicle mileage, vehicle direction, and mobile vehicle speed. Telematics unit 120 collects the data and generates the status information message.

During step 520, the status information message is sent to the telematics call center via a data call. The call will terminate immediately or wait for confirmation that the status information message was successfully received at the call center. During step 595, method 500 terminates.

FIG. 6 illustrates a flowchart 600 representative of one example of a method for providing subscriber input, in accordance with the present invention. The method begins at 601. During step 610, the telematics unit 120 receives an input request sent by the call center while the telematics unit is in the readiness mode. The input request is a request for additional information, a prompt for further subscriber input, or a query made to the mobile vehicle occupants.

During step 620, a response based on the particular input request is sent from the telematics unit 120 to the call center 170. Reponses include the requested information, the subscriber input, or an answer to the specific query made. Lack of response to the input request will alert the call center 170 to a potential problem in the mobile vehicle. During step 695, the method terminates.

FIG. 7 illustrates a flowchart 700 representative of one example of a method for providing a tracking record, in accordance with the present invention. The method begins at 701. During step 710, the telematics unit generates a tracking record that is updated at pre-determined time intervals as the mobile vehicle 110 travels. The tracking record includes location data associated with a date and time stamp. Additional data, such as vehicle occupancy, fuel level, and distance traveled is included in the tracking record as required.

During step 720, the tracking record is sent to a tracking storage location. The tracking storage location is either in the mobile vehicle 110, such as in memory 128 of telematics unit 120, or at a remote location such as call center 170, web hosting portal 160, or computer 150. The tracking record is maintained at the tracking storage location until requested by call center 170 or by an authorized third party. The tracking record is used, as needed, to recover the mobile vehicle 110, assist the subscriber, or assist a responder in locating the mobile vehicle. During step 795, the method terminates.

FIG. 8 illustrates a flowchart 800 representative of example method steps for determining a response prompt, in accordance with the present invention. The method begins at 801.

During step 810, a first readiness mode input extent is determined at the telematics unit. The first readiness mode input extent is associated with certain first readiness mode inputs such as a collision detection. For example, if a mobile vehicle collision is detected the severity of the collision will establish the first readiness mode input extent. If the collision is a fender bender, the first readiness mode input extent is considered a first level extent. As the severity of the collision increases the extent level increases.

During step 820, the first readiness mode input extent determined in step 710 is used to determine a corresponding response prompt. The response prompt is an inquiry to the subscriber generated by telematics unit 120. In the example of a first level extent, the response prompt is a query to the subscriber asking whether the subscriber wants to enable the readiness mode, to place a call to the call center immediately or to take no further action.

During step 830, the response prompt is sent to the subscriber through an output device such as speaker 132 or display 135.

During step 840, a response input, which is the reply to the response prompt is received at the telematics unit. An appropriate response input is based on the response prompt sent by the telematics unit. If an improper response or no response is received at the telematics unit, the call center can be alerted and the call center will determine how to proceed further. The call center can take an action, such as attempting to contact the subscriber, sending a vehicle diagnostic, or sending a responder to the mobile vehicle. The call center can also take no action. During step 895, the method terminates.

While the examples of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of providing a telematics readiness mode of operation to a user of a vehicle, comprising the steps of:

providing a response prompt from a telematics unit of a vehicle to a vehicle occupant querying whether the occupant wants the telematics unit to enter a readiness mode in which the telematics unit monitors for subsequent input indicative of a request for emergency assistance;

receiving a response input from the vehicle occupant instructing the telematics unit of the vehicle to enter into the readiness mode;

entering the readiness mode in response to the response input;

waiting for additional manual input; and carrying out a further action based on a determination made after waiting for the additional manual input, the further action comprising either the step of carrying out a readiness action or the step of terminating the readiness mode without performing the readiness action;

wherein the receiving step further comprises receiving the response input prior to the vehicle occupant exiting the vehicle and wherein the step of carrying out a further action comprises one of the following steps: (a) carrying out the further action in response to receiving the additional manual input from the vehicle occupant after the vehicle occupant has re-entered the vehicle, (b) determining that no additional manual input was received during a selected period of time and carrying out the readiness action in response to that determination; or (c) determining that no additional manual input was received during the selected period of time and terminating the readiness mode in response to the determination without carrying out the readiness action.

2. The method of claim 1, further comprising the step of receiving the additional manual input at the telematics unit and carrying out the readiness action in response to receipt of the additional manual input.

3. The method of claim 1, further comprising the step of receiving the additional manual input at the telematics unit and terminating the readiness mode in response to receipt of the additional manual input.

4. The method of claim 1, further comprising the steps of establishing a data connection between the telematics unit and a call center in response to the first manual input, and supplying vehicle data to the call center over the data connection.

5. The method of claim 1, further comprising the step of providing the response prompt in response to a readiness mode input.

6. The method of claim 5, wherein the readiness mode input comprises a collision detection.

7. The method of claim 1, wherein the readiness action comprises one of the following: notifying a responder, initiating vehicle tracking, disabling vehicle mobility, and sending a stored record.

8. The method of claim 1, wherein the response input comprises a voice command.

9. The method of claim 1, wherein the response input comprises a button press within the vehicle.

10. The method of claim 1, wherein the waiting step further comprises monitoring for receipt of the additional manual input prior to expiration of a timeout.

11. A method of providing a telematics readiness mode of operation to a user of a vehicle, comprising the steps of:
   providing a telematics unit in an initial telematics operational mode;
   receiving a first manual input from a vehicle occupant instructing the telematics unit of the vehicle to change from the initial telematics operational mode to a readiness mode in which the telematics unit monitors for subsequent input indicative of a request for emergency assistance;
   entering the readiness mode in response to the first manual input;
   waiting for additional manual input; and
   carrying out a readiness action after waiting for the additional manual input, wherein the readiness action comprises one of the following: notifying a responder, initiating vehicle tracking, and disabling vehicle mobility
   wherein the receiving step further comprises receiving the first manual input prior to the vehicle occupant exiting the vehicle and wherein the step of carrying out a readiness action comprises either (a) carrying out the readiness action in response to receiving the additional manual input from the vehicle occupant after the vehicle occupant has re-entered the vehicle, or (b) determining that no additional manual input was received during a selected period of time and carrying out the readiness action in response to that determination.

12. The method of claim 11, further comprising the step of receiving the additional manual input at the telematics unit and carrying out the readiness action in response to receipt of the additional manual input.

13. The method of claim 11, further comprising the steps of establishing a data connection between the telematics unit and a call center in response to the first manual input, and supplying vehicle data to the call center over the data connection.

14. The method of claim 11, wherein the first manual input comprises a voice command.

15. The method of claim 11, wherein the first manual input comprises a button press within the vehicle.

* * * * *